United States Patent
Harada et al.

[15] 3,656,980
[45] Apr. 18, 1972

[54] 4-TERTIARY-CATECHOL-AQUEOUS SOLUTION COMPOSITION

[72] Inventors: Tetsuya Harada, Chiba; Nobuo Fuzinami, Ichihara; Koichi Hasegawa, Chiba; Akira Shibatani, Ichihara, all of Japan

[73] Assignee: Japan Synthetic Rubber Co., Ltd., Tokyo, Japan

[22] Filed: Aug. 10, 1970

[21] Appl. No.: 62,609

[30] Foreign Application Priority Data

Aug. 12, 1969 Japan....................................44/63305

[52] U.S. Cl..............................106/285, 106/311, 252/73, 252/364, 260/666.5
[51] Int. Cl. .....................................................C08h 17/28

[58] Field of Search............106/285, 311; 260/666.5, 45.95; 252/73, 364

[56] References Cited

UNITED STATES PATENTS 3,405,189  10/1968  Sakuragi et al.....................260/666.5
2,114,832  4/1938  Evans..................................260/45.95

*Primary Examiner*—Julius Frome
*Assistant Examiner*—David A. Jackson
*Attorney*—Sherman and Shalloway

[57] ABSTRACT

A homogeneous 4-tertiary-butyl-catechol aqueous solution composition comprising 4-tertiary-butyl-catechol, water and a saturated hydrocarbon having five or more carbon atoms.

3 Claims, No Drawings

4-TERTIARY-CATECHOL-AQUEOUS SOLUTION COMPOSITION

This invention relates to a saturated hydrocarbon-containing 4-tertiary-butyl-catechol aqueous solution composition which is difficulty frozen at low temperatures.

4-Tertiary-butyl-catechol is used broadly as a polymerization inhibitor for many industrially valuable polymerizable monomers during their storage or during polymerization thereof, and as an antioxidant for polyolefins, various plastics, lubricants and the like. Although 4-tertiary-butylcatechol is sometimes used in the powdery or massive form, it is frequently used in the form of an aqueous solution consisting of 85 percent by weight of 4-tertiary-butyl-catechol and 15 percent by weight of water in view of equipment costs, manufacturing conditions and ease in handling. (The percentile ratio is based on weight throughout the specification unless otherwise specified.) In the latter case, since 4-tertiary-butyl-catechol takes a liquid form, the weighing and transportation thereof can be conducted very easily, but it possesses one fatal defect in that the solution has a high freezing point such as 6° –8° C. and it easily freezes during storage in winter. More specifically, at temperatures lower than the freezing point the solution freezes not only when stored in a tank but also while being transported in plant pipes or pumps. When it is allowed to stand during storage, it sometimes happens that the solution does not freeze at temperatures lower than the freezing point, but once the solution is moved or transferred, stimulation such as frictional contact with a pipe wall causes the solution to freeze. In order to melt the frozen solution it is necessary to stop the operation and conduct heating for a long time by means of a special heating device.

In order to lower the freezing point it has been proposed to prepare an aqueous solution from 4-tertiary-butyl-catechol containing small amounts of by-products such as 3-tertiary-butyl-catechol and di-tertiary-butyl-catechol. However, since these by-products are difficultly removed even by washing with alkalis, the remaining by-products give bad influences to subsequent operation steps and properties of end products, such as color. Accordingly, such method of lowering the freezing point is not appropriate.

The primary object of this invention is to provide a homogeneous 4-tertiary-butyl-catechol aqueous solution composition which is free of the above-mentioned defects, namely a 4-tertiary-butyl-catechol aqueous solution composition which has a low freezing point and retains the original polymerization-inhibiting and oxidation-preventing activities of 4-tertiary-butyl-catechol, whereby automatic weighing and transportation, to which great importance has been attached in the art, can be easily accomplished even in winter.

The above object of this invention can be attained by adding to a mixture system comprising water and 4-tertiary-butyl-catechol a saturated hydrocarbon as a third component which does not adversely affect the utility of 4-tertiary-butyl-catechol. Generally, saturated hydrocarbons are immiscible with water and form a separate phase when admixed therewith, but it has been unexpectedly found that, in the system comprising water, 4-tertiary-butyl-catechol and a saturated hydrocarbon according to this invention, they are uniformly admixed with one another and the resulting composition is very stable.

Saturated hydrocarbons having five or more carbon atoms, especially up to 10 carbon atoms are preferably used in this invention. As such saturated hydrocarbon there may be cited n-pentane, n-hexane, 3-methylpentane, 2,3-dimethylbutane, n-heptane, 2-methylhexane, 3-ethylpentane, 2,4-dimethylpentane, n-octane, 2-methylheptane, 2,5-dimethylhexane, 2,4,4-trimethylpentane, n-nonane, n-decane, cyclopentane, cyclohexane, methylcyclopentane, methylcyclohexane, ethylcyclopentane, 1,1-dimethylcyclopentane, 1,2-dimethylcyclopentane, cyclooctane, ethylcyclohexane, 1,3-dimethylcyclohexane and paramenthane. In this invention it is preferable that the composition is composed of 50 – 93 percent of 4-tertiary-butyl-catechol, 5 – 48 percent of water and 2 – 45 percent of a saturated hydrocarbon, or 0.5 – 45 percent of 4-tertiary-butyl-catechol, 0.5 – 10 percent of water and 50 – 90 percent of a saturated hydrocarbon. A composition composed of 70 – 90 percent of 4-tertiary-butyl-catechol, 5 – 25 percent of water and 5 – 25 percent of a saturated hydrocarbon is particularly preferred.

4-tertiary-butyl-catechol, water and a saturated hydrocarbon are well mixed together at room temperature if the composition ratio is maintained within the above-mentioned range, and the intended composition can be easily prepared with good reproducibility in a vessel equipped with a simple stirrer. Such composition of this invention is advantageous in the following points; an aging treatment such as required in the preparation of the conventional 4-tertiary-butyl-catechol-water mixture is not necessary in the present invention; when compared with the conventional 4-tertiary-butyl-catechol-water mixture system, the composition of this invention has a very low viscosity at the same 4-tertiary-butyl-catechol concentration, and therefore, the operability can be highly improved; and even if the saturated hydrocarbon contained in the composition of this invention remains in the polymerization system after the treatment for removal of 4-tertiary-butyl-catechol, it does not adversely affect the polymerization reaction. Accordingly, the composition of this invention is of great industrial utility.

This invention will now be detailed by referring to examples. Since the 4-tertiary-butyl-catechol aqueous solution compositions exhibit a temperature-time curve comprising temperature lowering-super cooling-temperature rising-plateau, the stability of the composition is evaluated based on the freezing point in each example.

EXAMPLE 1

A mixture composed of 70 % by weight of 4-tertiary-butyl-catechol (having a purity of 99.5 percent; the purity being the same hereinafter), 9 percent by weight of a hexane mixture (composed of 65 percent by weight of n-hexane, 13 percent by weight of 3-methylpentane, 4 percent by weight of 2-methylpentane and 18 percent by weight of methylcyclopentane) and 21 percent by weight of water was mixed intimately to thereby form an aqueous solution composition having a freezing point of −2° C. When the composition was allowed to stand or under similar conditions, the composition was stable at −10° C. for more than 10 days.

EXAMPLES 2 – 16

4Tertiary-butyl-catechol, water and a saturated hydrocarbon as indicated in Table 1 were mixed together in the same manner as in Example 1. The mixing ratios of the components and the freezing points of the resulting compositions are shown in Table 1. Each of the resulting composition was stable at −10° C. for more than 10 days when kept at rest or in a similar state.

TABLE 1

| Example No. | 4-tertiary-butyl-catechol (Percent by weight) | Water (Percent by weight) | Saturated hydrocarbon Amount (Percent by weight) | Kind | Freezing point (° C.) |
|---|---|---|---|---|---|
| 2 | 75 | 12.5 | 12.5 | Cyclohexane | −1.7 |
| 3 | 80 | 14 | 6 | 2,4,4-trimethypentane | −2 |
| 4 | 65 | 25 | 10 | n-Nonane | −1 |
| 5 | 15 | 2 | 83 | Hexane mixture same as used in Example 1 | 0 |
| 6 | 15 | 2 | 83 | n-Nonane | −1 |
| 7 | 88 | 6 | 6 | n-Decane | 1 |

TABLE 1 – Continued

| Example No. | 4-tertiary-butyl-catechol (Percent by weight) | Water (Percent by weight) | Saturated hydrocarbon | | Freezing point (° C.) |
|---|---|---|---|---|---|
| | | | Amount (Percent by weight) | Kind | |
| 8 | 72 | 23 | 5 | n-Pentane | 1.5 |
| 9 | 72 | 7 | 21 | Cyclopentane | −2 |
| 10 | 79 | 5 | 16 | n-Hexane | −1 |
| 11 | 42 | 2 | 56 | n-Nonane | −1 |
| 12 | 62 | 24 | 14 | Methycyclohexane | 1 |
| 13 | 56 | 10 | 34 | Cyclohexane | 1 |
| 14 | 34 | 4 | 62 | 2,4,4-trimethylpentane | 0 |
| 15 | 25 | 4 | 71 | n-Nonane | 0 |
| 16 | 10 | 3 | 87 | 3-methylpentane | −1 |

What we claim is:

1. A homogeneous 4-tertiary-butyl-catechol aqueous mixture consisting essentially of 50 – 93 percent by weight of 4-tertiary-butyl-catechol, 5 – 48 percent by weight of water and 2 – 45 percent by weight of a saturated hydrocarbon having five to 10 carbon atoms.

2. A homogeneous 4-tertiary-butyl-catechol aqueous mixture consisting essentially of 0.5 – 45 percent by weight of 4-tertiary-butyl-catechol, 0.5 – 10 percent by weight of water and 50 – 90 percent by weight of a saturated hydrocarbon having five to 10 carbon atoms.

3. A homogeneous 4-tertiary-butyl-catechol aqueous mixture consisting essentially of 70 – 90 percent by weight of 4-tertiary-butyl-catechol, 5 – 25 percent by weight of water and 5 – 25 percent by weight of a saturated hydrocarbon having five to 10 carbon atoms.

* * * * *